United States Patent
Mar et al.

(10) Patent No.: US 10,934,677 B2
(45) Date of Patent: Mar. 2, 2021

(54) SYSTEMS, METHODS AND MACHINES FOR CONSTRUCTING FOUNDATION PIERS

(71) Applicant: Ojjo, Inc., San Rafael, CA (US)

(72) Inventors: David Mar, Berkeley, CA (US); Daniel Flanigan, Petaluma, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

(21) Appl. No.: 16/600,225

(22) Filed: Oct. 11, 2019

(65) Prior Publication Data

US 2020/0115874 A1 Apr. 16, 2020

Related U.S. Application Data

(60) Provisional application No. 62/744,471, filed on Oct. 11, 2018.

(51) Int. Cl.
| | |
|---|---|
| *E02D 3/054* | (2006.01) |
| *E02D 7/26* | (2006.01) |
| *E02D 27/26* | (2006.01) |
| *E02D 5/24* | (2006.01) |
| *E02D 5/52* | (2006.01) |
| *E02D 5/56* | (2006.01) |

(52) U.S. Cl.
CPC ............. *E02D 3/054* (2013.01); *E02D 5/24* (2013.01); *E02D 5/523* (2013.01); *E02D 5/56* (2013.01); *E02D 7/26* (2013.01); *E02D 27/26* (2013.01)

(58) Field of Classification Search
CPC .. E02D 3/02; E02D 3/046; E02D 5/52; E02D 5/526; E02D 5/801; E02D 7/02; E02D 7/06; E02D 7/22; E02D 7/26; E02D 27/26; E02D 27/28; E02D 3/054

USPC ....... 175/22; 405/242, 244, 252.1, 253, 254, 405/271

See application file for complete search history.

(56) References Cited

U.S. PATENT DOCUMENTS

| | | | | |
|---|---|---|---|---|
| 3,512,366 | A * | 5/1970 | Turzillo | E02D 5/30 405/241 |
| 3,896,890 | A * | 7/1975 | Gale | E02D 5/801 175/19 |
| 3,952,523 | A * | 4/1976 | Gale | E02D 5/801 405/259.1 |
| 4,790,689 | A * | 12/1988 | Henn | E02D 27/26 405/231 |
| 4,863,137 | A * | 9/1989 | Cockman | E02D 5/801 248/545 |
| 4,923,165 | A * | 5/1990 | Cockman | E02D 5/801 248/156 |
| 6,334,281 | B1 * | 1/2002 | Oliver | E02D 5/801 248/156 |
| 6,641,332 | B1 * | 11/2003 | Alvarado | E02D 5/28 175/323 |

(Continued)

FOREIGN PATENT DOCUMENTS

JP 62025612 A * 2/1987

*Primary Examiner* — Frederick L Lagman
(74) *Attorney, Agent, or Firm* — Phillip Mancini

(57) ABSTRACT

A machine, method and system for installing helical foundation piers that sues a driving tamper connected to a rotary tool to drive helical piers into the ground. Once the pier reaches the target depth, the tamper is decoupled, and counter rotated away from the pier. While it is withdrawn the soil between the driven and pier and the driving tamper is compressed by intermittent downward action of the tamper.

6 Claims, 4 Drawing Sheets

(56) References Cited

U.S. PATENT DOCUMENTS

| | | | | |
|---|---|---|---|---|
| 7,241,079 | B2* | 7/2007 | Francis | E02D 5/56 |
| | | | | 248/530 |
| 7,353,891 | B2* | 4/2008 | Nolan | E02D 5/801 |
| | | | | 175/323 |
| 9,169,611 | B2* | 10/2015 | Fox | E02D 3/08 |
| 9,217,293 | B1* | 12/2015 | Blum | E21B 10/44 |
| 2005/0074299 | A1* | 4/2005 | Nolan | E02D 5/801 |
| | | | | 405/259.1 |
| 2005/0100416 | A1* | 5/2005 | Whitsett | E02D 5/38 |
| | | | | 405/233 |
| 2006/0013656 | A1* | 1/2006 | Blum | E21B 10/44 |
| | | | | 405/241 |
| 2009/0290940 | A1* | 11/2009 | Martin, Sr. | E02D 7/16 |
| | | | | 405/232 |
| 2011/0305527 | A1* | 12/2011 | Curic | E21B 10/44 |
| | | | | 405/271 |
| 2013/0004243 | A1* | 1/2013 | DeFrang | E02D 31/002 |
| | | | | 405/233 |
| 2018/0274298 | A1* | 9/2018 | McMillan | E02D 7/02 |

* cited by examiner

Top View

Side View

Top View

Side View

Top View

Side View

SYSTEMS, METHODS AND MACHINES FOR CONSTRUCTING FOUNDATION PIERS

CROSS REFERENCE TO RELATED APPLICATIONS

This claims priority to U.S. provisional patent application No. 62/744,471, filed Oct. 11, 2018, the disclosure of which is hereby incorporated by reference in its entirety.

BACKGROUND

Solar energy is one of the world's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter*$\pi$*6,371,000 meters$^2$ yields about 32,000 terra (trillion) watts of energy that continuously strikes Earth's surface. Assuming the sun continues to burn and emit photons for a billion more years, the survival of human life will ultimately depend on harnessing this essentially unlimited, source of clean energy.

As in most industries, achieving scale is critical to maximizing the competitiveness of solar relative to other energy sources. This economic reality militates in favor of large-scale (multi-megawatt to multi-gigawatt) solar power plants over distributed residential solar, although there is room for both modalities in the market place. Large-scale solar power plants are predominantly configured as either fixed-tilt or single-axis tracker arrays. Fixed-tilt arrays are arranged as East-West oriented rows of panels tilted South at an angle dictated by the latitude of the array site. By contrast, single axis trackers consist of rows of solar panels arranged on a rotating North-South axis called a torque tube that sweeps through an East to West rotation through the course of a day, following the sun's progression through the sky. For purposes of this disclosure, both fixed-tilt and single axis trackers will be referred to collectively as axial solar arrays.

Many large-scale solar projects are funded with so-called power purchase agreements (PPAs), whereby a customer agrees to purchase the power generated by the array at a predetermined megawatt hour rate (e.g., $25-35 per megawatt hour at today's prevailing rates) for a fixed period (e.g., 20 or 30 years). Knowing the lifetime of the system to be at least that long, and in many cases longer, a banks and/or other investors are comfortable financing such a project given the predictable stream of revenue it will generate over its lifetime.

Excluding land acquisitions costs, overall project costs typically include site preparation (road building, leveling, grid and water connections etc.), foundation piers, tracker hardware or fixed-tilt hardware, photovoltaics, inverters and electrical (conduit, wiring, trenching, etc.). Inherent in all of these are also labor costs. At today's prevailing rates, this totals about $1 per watt of energy. So, building a 100-megawatt solar power plant today would cost approximately $100,000,000 dollars.

Many of these system component costs have dropped over the past few years, including solar panels and solar mounting hardware, however, one area that has been mostly overlooked is the cost associated with foundations. Foundations physically couple solar trackers or fixed-tilt solar arrays to the earth. Unlike trackers, foundations have been generic. Typically, after the site has been prepped, a grid of H-piles or other structures are driven into the ground at regular intervals and other components are subsequently attached to those piles to form the array. In a conventional, large-scale single-axis tracker array, these piers may represent 5-10 percent of the cost of the array. Despite this relatively small share of the total cost, any savings in steel and labor associated with foundations adds up to a significant amount of money over a multi-gigawatt portfolio of solar projects. This is particularly true in the utility-scale solar business because many of these deals are locked in years before construction begins. Therefore, post-deal savings will be in addition to the profits already factored in the deal.

In light of the foregoing, is an object of various embodiments of this invention to reduce steel and associated labor costs used to in foundations for single-axis tracker arrays.

DETAILED DESCRIPTION

Figure 1A:
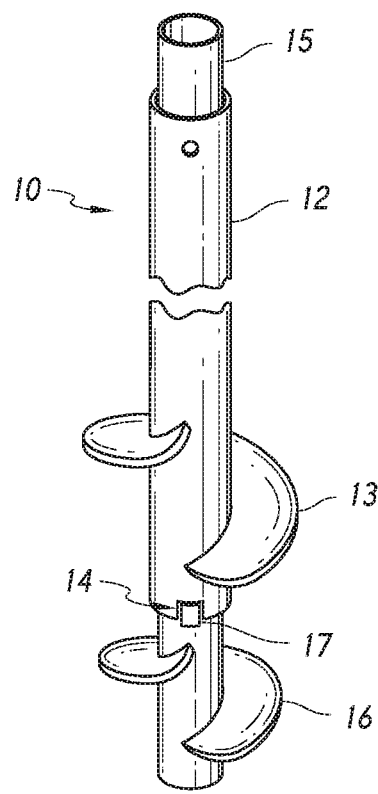
FIG. 1A is a front view of a foundation pile assembly according to various exemplary embodiments of the invention.

Helical anchors or so-called earth anchors are known in the art. They are used in a wide variety of applications including supporting signs and posts, guy wires, building foundations, and retention walls because of their ability to provide relatively strong resistance to axial forces with minimal disturbance to the soil and very little material. A helical anchor usually consists of one or more helical flights or plates attached at or near the end of an elongated rod, pile or pier that is rotated into supporting ground. The relatively large orthogonal cross section of the helical flight as compared to the narrow shaft massively increases the anchor's resistance to tensile and compressive forces along its axis relative to a basic pile that relies solely on skin friction, making them ideal for applications that requiring mostly axial resistance.

One problem with helical anchors is that as they are spun into the ground, they cut through the soil in their path leaving behind a relatively loose column of soil compared to the soil's density before it was disturbed. Even a small mismatch between the feed speed and the product of the rotational speed and the helical anchor's pitch results in the soil being compromised as the helical acts like either an auger or a punch, both of which exacerbate this problem. To compensate, helical anchors are often driven deeply so that they can achieve the required resistance to pull-out even if the column of soil above it is disturbed. Unfortunately, driving deeper increases the power needed and requires more steel to span the increased distance between the anchor and the surface-level connection point, negating some of the material savings afforded by helical anchors relative to other anchors. Also, the requirement to drive more deeply precludes the use of helical anchors at shallow depths (e.g., 3-5 feet).

One alternative to helical anchors that addresses the problem of disturbing the soil is to use anchors that stay in a first geometry during driving that has a minimized orthogonal cross section and are transformed to a second geometry below ground that has a relatively larger orthogonal cross section. Typically, this requires tensioning a cable or pulling or twisting a rod that trails the anchor as it goes down to deploy or "set" the anchor. The larger orthogonal cross section of the deployed anchor provides greater pullout resistance with less disturbance to the column of soil above it on the way down, however, it requires the additional step of setting and tools and/or equipment capable of generating the high forces required to do so. Also, as the anchor moves from the minimized geometry to the maximized geometry, a void is left behind that may result in some axial slippage or wobble when the anchor is loaded. Therefore, these types of anchors do not fully solve the problem.

The inventors of this disclosure have discovered through experimentation that tamping the soil over a helical anchor after driving reconstitutes the soil and greatly increases its resistance to pullout relative to anchors installed in soil that has not been tamped after driving. In fact, tamping is so effective that augering out a clean borehole and placing the helical anchor at the bottom before backfilling and tamping over the anchor provides greater resistance to pullout than simply driving a helical anchor into the ground, with or without tamping. Although this solution could potentially enable earth anchors to be used at relatively shallow depths (e.g., three to five feet), it is not ideal for large-scale use because it requires several additional process steps that are difficult to automate. These include handling the spoils removed from the hole, carrying and dispensing backfill material if necessary, and even potentially having to case the borehole to prevent from it collapsing before the helical anchor can be installed. Therefore, it would desirable to have an anchoring foundation solution that provides strong resistance to axial forces of tension and compression, that is usable at shallow depths, and that does not require additional process steps that are difficult and/or expensive to automate.

Figure 1B:
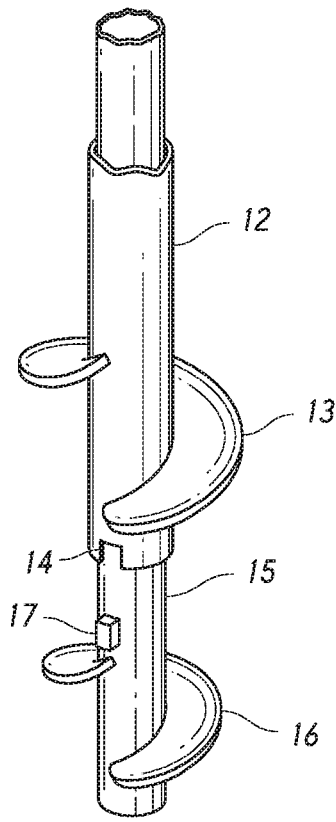
FIG. 1B is another view of the foundation pile assembly of 1A.
Figure 1C:
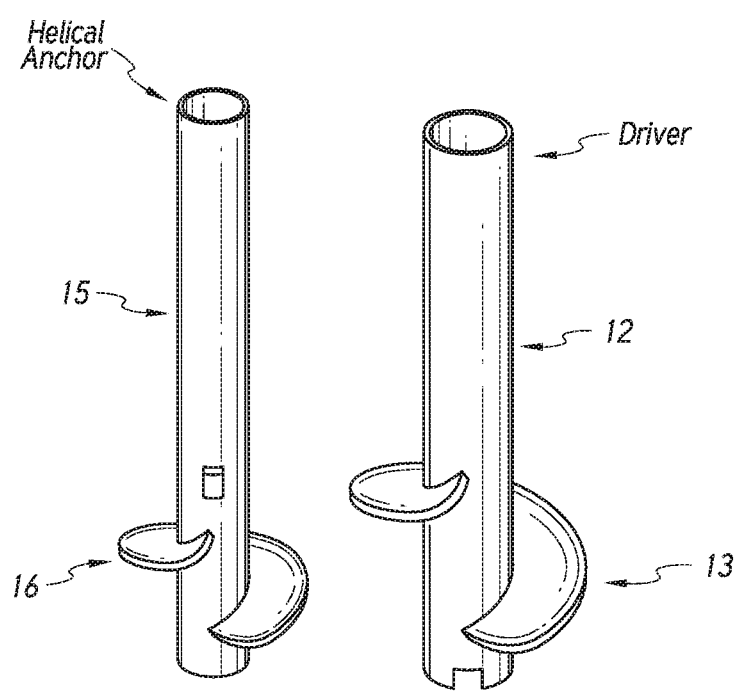
FIG. 1C is a front view of the foundation pile assembly of 1A with the helical anchor and driver separated.

To that end, FIGS. 1A-1C show a foundation pile assembly for use with an axial solar array according to various embodiments of the invention. Assembly 10 shown in these exemplary figures consists of base pile member 15 and driving tamper 12. Helical pier member 15 is an elongated tube with helical flight or helix 16 proximate to the leading end (i.e., the below-ground end). Driving tamper 12 is similarly configured as a hollow elongated member with helical flight or helix 13 at its below-ground end. In various embodiments, driving tamper 12 is dimensioned to fit over helical pier 15 like a sleeve until helix 13 rests just above helix 16 formed on helical pier 15. In various embodiments, one or more alignment projections 17 may be formed on the outer surface of helical pier 15 to enable it to fit with driving tamper 12 in a way that aligns helix 13 as an extension of helix 16. In various embodiments, one or more projections 17 may mate with one or more recesses cut in the bottom edge of the driving tamper, such as recess 14, so that the end of helix 16 flows continuously into the beginning of helix 13, even if they have different outside diameters.

In various embodiments, both driving tamper 12 and helical pier 15 will have a pair of holes that bisect their main axes so that when helices 13 and 16 are aligned, the respective pairs of holes formed in tamper 12 and pier 15 will overlap so that they are co-axial. This will enable a single pin to pass through each component twice. In other embodiments, driving tamper 12 and helical pier 15 may each have two pairs of opposing holes at different places along their respective axes so that two orthogonal pins may be used to detachably couple them together.

In various embodiments, the one or more pins may also pass through holes on the driving head of a rotary driver that surrounds the above ground end of one or both components or that passes inside one or both. In this way, the equipment supporting the rotary driver may remain attached to driving tamper 12 and be able to carry helical pier 15 to orient assembly 10 at the correct location and angle for driving into the supporting soil. As drawn in the Figures and evidenced by the orientation of helices 13 and 16, clockwise rotation of the driver will cause the assembly to drive down into the soil. In various embodiments, helix 13 may have a larger maximum outside diameter than helix 16. This may be advantageous for at least two reasons. First, as explained in greater detail herein, for down-the-hole (DTH) tamping to be effective, the soil column needs to be loose. Second, helix 13 also functions as a tamper. Therefore, the larger its surface area, the more effective it will be at tamping the soil above and around helical pier 15. Notwithstanding their possible size difference, in various embodiments, the pitch of helices 13 and 16 will be the same. That is, the distance that the helix travels down for each rotation of the assembly will be equal. In various embodiments, equalizing the pitches will make them easier to drive as an assembly. In other embodiments, they may be different to intentionally disturb the soil.

Figure 2A:
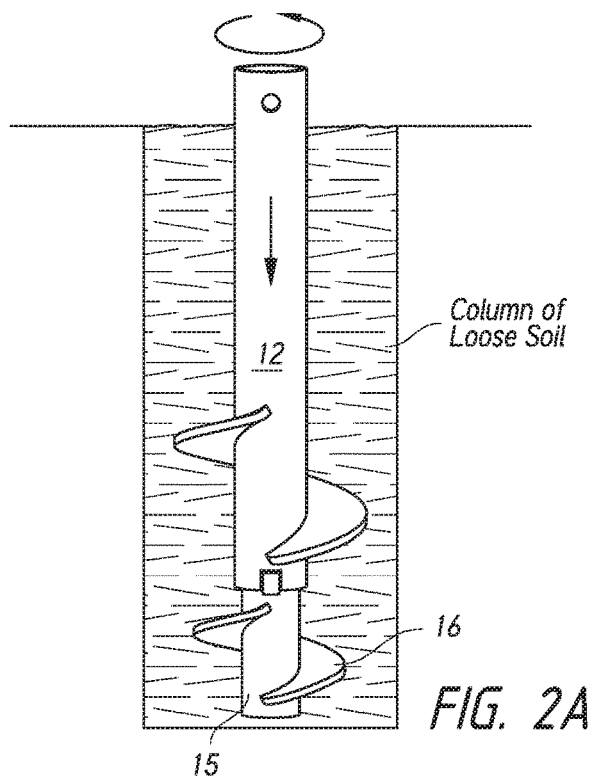
FIGS. 2A-2C detail the process for forming a foundation pier with foundation assembly of FIG. 1A.
Figure 2B:
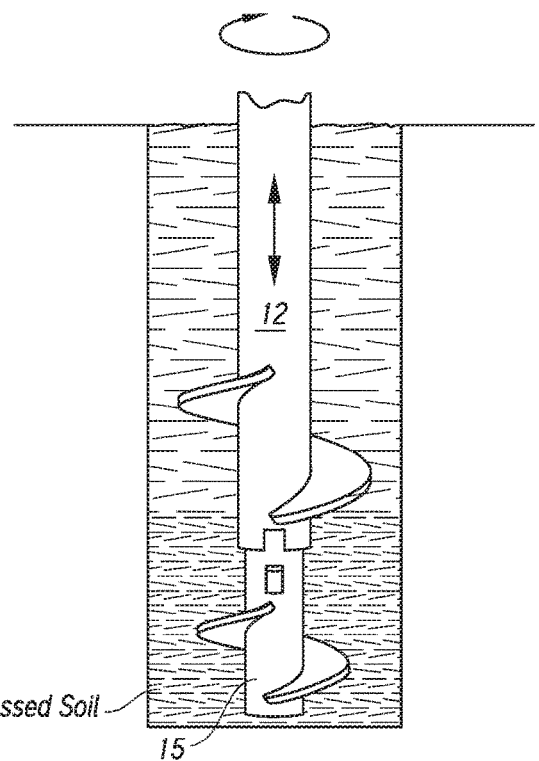
Figure 2C:
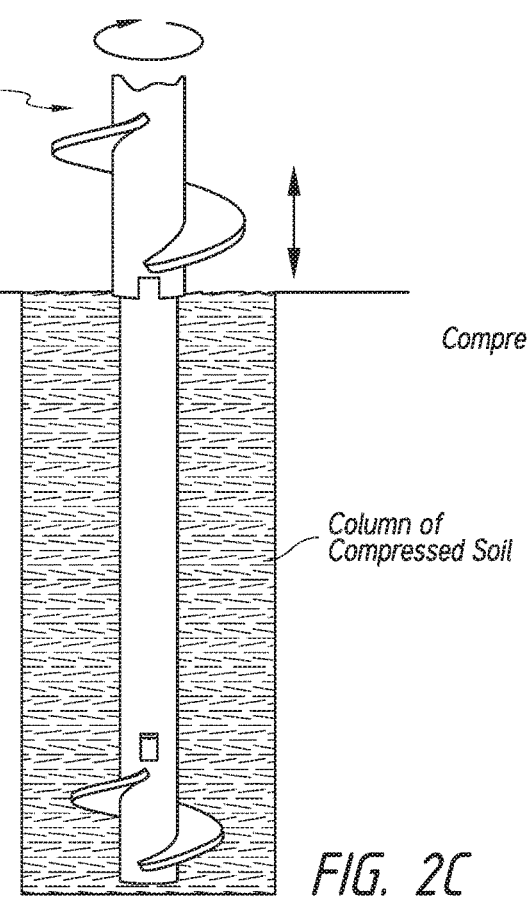

FIGS. 2A, 2B and 2C detail the process of forming a foundation pier with foundation assembly 10 of FIGS. 1A-1C. In FIG. 2A, driving tamper 12 is slipped over helical pier 15 or, alternatively, helical pier 15 is slipped into an opening in the bottom of driving tamper 12 until helix 13 rests above helix 16 and the two are aligned and coupled via the fitment between notch 14 and projection 17. Assembly 10 is then driven into the supporting ground, such as, for example, with a rotary driver attached to a machine capable of imparting downforce, causing tamper 12 and pier 15 to simultaneously travel into the soil. This continues until helix 16 at the bottom of helical pier 15 reaches its target depth. As seen in 2A, the column of soil that was passed through by tamper 12 and helical pier 15 is deconstructed into a loose fill from the cutting action of the helixes, represented by the widely spaced wavy lines making up the column. When installing a conventional helical anchor, it is desirable to minimize this type of soil disturbance because it weakens the anchor's resistance to pull-out, but various embodiments of the invention may rely on soil disturbance during driving to enable tamping to occur below ground as the driving tamper is being removed.

After the target depth is achieved, driving tamper 12 is decoupled from helical pier 15 so that the latter remains at the bottom of the bore. In various embodiments, this may be accomplished by pulling one or more pins interconnecting them. After, the rotary driver may be connected to driving tamper 12 only. Decoupling driving tamper 12 from helical pier 15 allows it counterrotate to back it away from helical pier 15.

Turning now to FIG. 2B, this figure shows a later stage after driving tamper 12 has been decoupled from helical pier 15 and has traveled approximately one-quarter of the way back out of the bore hole. As it counterrotates, or alternatively during pauses of counterrotation, driving tamper 12 travels repetitively up and down to tamp the soil between helix 13 on driving tamper 12 and the portion of helical pier 15 below it, including helix 16. In various embodiments, while tamping, it may be advantageous to move driving tamper 12 relatively slowly on the way up and relatively faster on the way down, to allow soil to fall through helix 13 during the upward portion of the cycle. As represented in the drawing by the tightly spaced horizontal lines, the soil under driving tamper 12 has been compressed, both with itself into the undisturbed soil surrounding the column traveled by the assembly. In various embodiments, this process of withdrawal based on counterrotation and tamping continues iteratively until the driving tamper has completely exited the soil, leaving the base foundation pile firmly buried in the compressed column of soil with little or no spoils above or around helical pier 15, as seen, for example, in FIG. 2C.

It should be appreciated that helix 16 at the bottom end of helical pier 15 may have the same diameter as helix 13 on driving tamper 12. In such embodiments, the respective helixes 13/16 may fit directly over top of one another even though the shaft of driving tamper 12 will have a larger inside diameter than the outside diameter of the shaft of helical pier 15. This may require that driving tamper 12 is first elevated (i.e., pulled straight up) to clear helix 16 prior to counterrotation to prevent it from also rotating the base foundation pile when the rotary driver is reversed. In other embodiments, helix 16 on helical pier 15 may be smaller or larger than helix 13 on driving tamper 12.

Figure 3A:
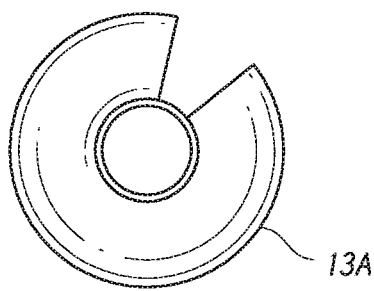
FIG. 3A shows top and side views of a single-flight helix according to various embodiments of the invention.
Figure 3A:
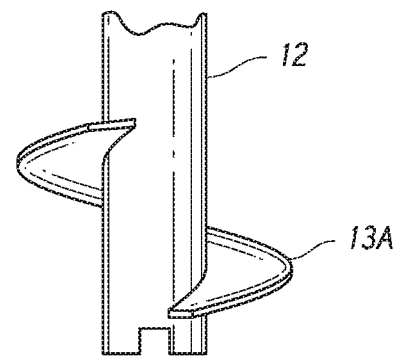
Figure 3B:
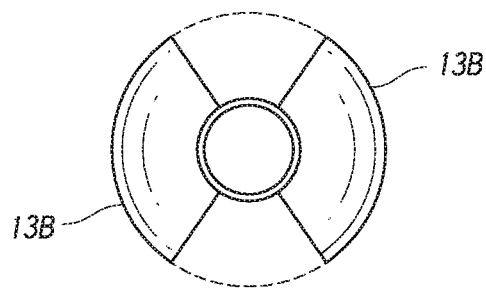
FIG. 3B shows top and side views of a double-flight helix according to various embodiments of the invention.
Figure 3B:
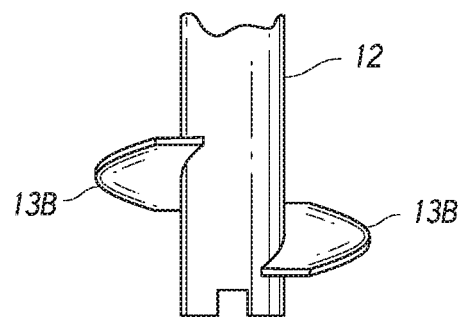
Figure 3C:
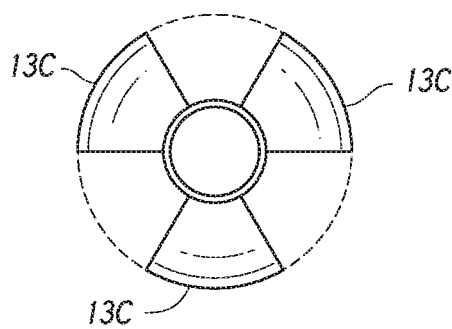
FIG. 3C shows top and side views of a triple-flight helix according to various embodiments of the invention.
Figure 3C:
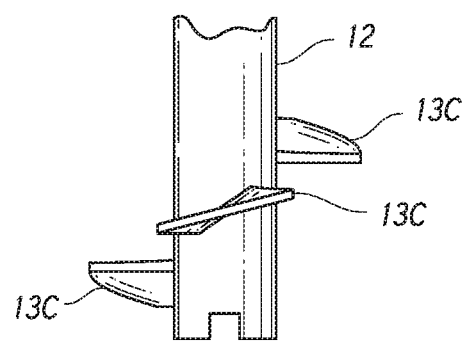

FIGS. 3A-3C show various exemplary shapes of helix 13 for the driving tamper. In various embodiments, helix 16 on helical pier 15 may be designed for maximum surface area while helix 13 may require balancing surface area against other constraints, including tamping effectiveness and the ability to allow soil to pass through it as it travels out of the bore. FIG. 3A shows basic single-flight helix 13A. Such helixes are typically constructed from a relatively thin disk of metal with a hole punched in the center and a notch removed from the outer perimeter to the inner perimeter. Then, either under heat or at room temperature, the disk is stretched out of its plane in opposite directions on either side of the notch to make it 3-dimensional. Then, it is welded or otherwise attached to the outer surface of a section of pipe. When viewing such a helix from top or bottom, it appears to extend nearly 360 degrees around the circumference of the pipe. This type of helix may be useful in very loose soil types because of the large surface area, however, it may be unsuitable for denser soils because the full helical flight may prevent such soils from falling back through the helix as the driving tamper is removed.

FIG. 3B shows another exemplary helix 13B made of two portions distributed around the shaft of driving tamper 12. Helix 13B takes on a bow-tie shape when viewed from above or below as the portions of the helix occupy approximately 100 to 180-degrees of the available circumference. As seen in the side view, in various embodiments, the two sections of helix 13B may follow the same pitch as if they were a single continuous flight but with a section removed between them. This type of helix may be more suitable for denser soils due to the large opening between the two sections of helix 13B. Similarly, helix 13C shown in FIG. 3C consists of three sections, or, in other words, a full helix with three equal-sized sections removed. This specific geometry may be advantageous for medium dense soils. In all three examples, the pitch of the helixes may mirror the pitch of helix 16 of helical pier 15 to enable it to follow helix 16 during driving with reduced resistance while at the same time allowing driving tamper 12 to move through the loose soil when it is being withdrawn and tamped.

It should be appreciated that although not shown in the figures, in some embodiments, helix 13 of driving tamper 12 may take on a different geometry than that shown in FIGS. 3A-3C. For example, helix 13 could be divided into four or more individual sections and each section could have the same shape as opposed to following a single helix. As another example, helix 13 could be a full helix with one or more sections removed (e.g., pie-shaped section, square section, etc.) or with holes drilled in the face of it to allow soil to pass through. Also, in some embodiments, it may be desirable for the pitch of helix 13 to be different than the pitch of helix 16 to increase deconstruction of the column of soil during driving. Further, the shaft of the driving tamper may have one or more holes formed in its surface in addition to the hole at the center of helix 13 to facilitate the dispensing of a soil hardening agent during tamping. Such an agent may further reinforce the compressed column of soil above and around the base foundation pile.

Figure 4:
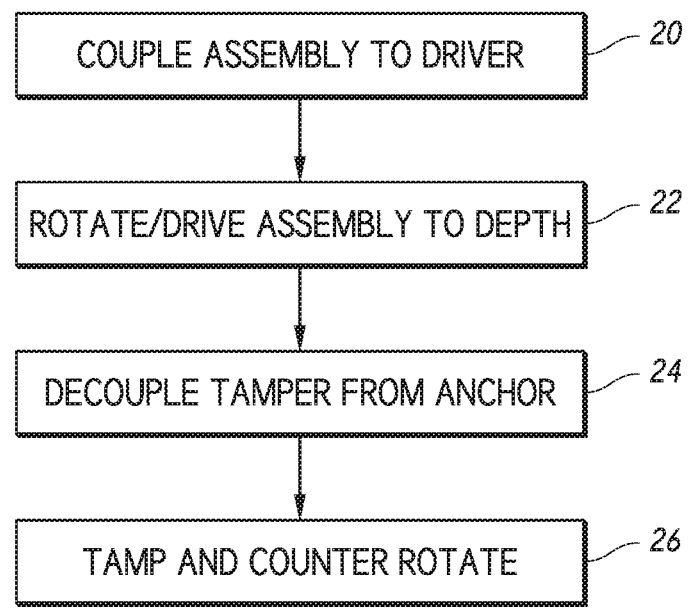
FIG. 4 is a flow chart detailing the steps of a method for forming a foundation pier according with the system of FIG. 1A according to various embodiments of the invention.

Turning now to FIG. 4, this figure is a flowchart detailing steps of a method for creating a foundation pier according the various embodiments of the invention. The method begins once the installation machine is positioned near the desired installation location. In various embodiments the machine may be a general-purpose machine such as an excavator, backhoe or tractor with a rotary driver attachment. In other embodiments, a special-purpose machine may be used. The machine may include a rotary driver mounted on a mast or on the arm of an excavator so that as the rotary driver is activated, axial force may also be applied to either push down or pull up on the tamping driver. In either case, once the machine is positioned near the desired pile location, in step 20, the assembly, including the tamping driver and helical pier, is coupled to the driver. In various embodiments, the tamping driver may remain connected to the rotary driver while a new helical pier is attached to it by sliding it up and inside the tamping driver. As discussed herein, the helical pier may be coupled to the driving tamper via a pin or other coupling mechanism that can be selectively and easily disconnected.

Next, once the assembly is lifted by the machine directly over the desired installation location and adjusted to the desired installation angle, in step 22, driving may begin. In various embodiments, this consists of actuating the rotary driver to spin the assembly into the ground, allowing the respective helixes to cut through the supporting soil, pulling the assembly behind them. Downward pressure from the rotary driver and/or the equipment supporting it may facilitate this action. The rotary driver may continue spinning the assembly in the same direction until a target depth has been reached whereby the main axis of the base foundation pile is oriented as a vector into the ground at the desired angle with the helix at its base oriented orthogonal to that axis at the bottom of the column of dirt traversed by the assembly. The machine may automatically stop driving at the target depth or the operator may issue a command to make the machine stop driving when the helical pier has reached sufficient embedment.

Next, in step 24, the tamping driver is decoupled from the helical pier. As discussed herein, this may be accomplished by pulling one or more pins interconnecting the two structures. This allows the base foundation pile to move relative to the base foundation pile without disturbing the installed pile. This may also require pulling straight up on the tamping driver to dislodge the projection formed on the helical pier from the corresponding notch formed on the tamper driver. In various embodiments, and as discussed herein, the rotary driver may be actuated to rotate in the opposite direction than that used for driving, allowing the respective helixes of the helical pier and the driving tamper to separate. In the last step, step 26, concurrent with withdrawal, the rotary driver or another driver acting in parallel with the rotary driver may begin to tamp down on the loose soil between the underside of the helix at the base of the tamping driver and the top of the helix formed on the helical pier. This may be done as the driving tamper is rotating or, alternatively, rotation may be temporarily halted each time tamping occurs. In various embodiments, tamping may involve raising the tamper axially in a relatively slow motion and then rapidly accelerating the tamper back downward the same distance or a fraction of that distance. In various embodiments, the range of axial motion traveled by the helix on the driving tamper may be a small fraction of the depth of the helical pier to prevent soil from the column from exiting and dispersing above the column as the driving tamper is withdrawn. In various process the motions of counterrotation may continue incrementally, either stepwise or in tandem until the driving tamper is completely backed out of the column of soil, leaving the installed helical pier behind with a column of compressed soil above the helix and around the pier's shaft. Also, as discussed above, as the driving tamper is being withdrawn, a soil hardening agent may be dispensed through the bottom or through additional holes in the tamper. Such an agent will amend the properties of the native soil increasing its bearing capacity and resistance to axial forces imparted to the base foundation pile. Examples of agents that may be used include but are not limited to any combination of cement, sand, silt, clay, gravel, crushed stone, slag, caliche, lime rock, polymers, and even waste materials including cinders, fly ash, foundry sands, and screenings from quarries and gravel pits.

The embodiments of the present invention are not to be limited in scope by the specific embodiments described herein. For example, although many of the embodiments disclosed herein have been described with reference to systems and methods for installing foundation components for axial solar arrays, the principles herein are equally applicable to foundations for other structures. Indeed, various modifications of the embodiments of the present invention, in addition to those described herein, will be apparent to those of ordinary skill in the art from the foregoing description and accompanying drawings. Thus, such modifications are intended to fall within the scope of the following appended claims. Accordingly, the claims set forth below should be construed in view of the full breath and spirit of the embodiments of the present inventions as disclosed herein.

The invention claimed is:

1. A method of driving a foundation component with a rotary tool comprising:
   rotating a tamping driver into supporting soil with a rotary tool causing the tamping driver to drive a foundation component to a desired embedment depth; wherein the foundation component comprises a helical pier having a first helical portion and an elongated shaft;
   disengaging the tamping driver from the helical pier; and
   removing the tamping driver from the supporting soil while intermittently tamping soil between the tamping driver and the driven helical pier.

2. The method according to claim 1, wherein driving a tamping driver into supporting soil with a rotary tool comprises applying torque and downforce to the tamping driver.

3. The method according to claim 1, wherein disengaging the tamper driver from the foundation component comprises removing at least one pin connecting the tamper driver and foundation component together.

4. The method according to claim 1, wherein disengaging the tamper driver from the foundation component comprises pulling up on the driver with the rotary tool to decouple a below ground portion of the driver from the foundation component.

5. The method according to claim 1, wherein removing the tamping driver from the supporting soil comprises counter rotating the tamping driver while applying up force to the driver.

6. The method according to claim 1, wherein the tamping driver engages an alignment portion proximate to the first helical portion.

\* \* \* \* \*